United States Patent
Kim et al.

(10) Patent No.: US 8,953,300 B2
(45) Date of Patent: Feb. 10, 2015

(54) MULTILAYER CERAMIC CAPACITOR AND METHOD OF MANUFACTURING THE SAME

(71) Applicant: Samsung Electro-Mechanics Co., Ltd., Suwon, Gyunggi-do (KR)

(72) Inventors: Kyu Ree Kim, Gyunggi-do (KR); Byoung Hwa Lee, Gyunggi-do (KR); Eun Hyuk Chae, Gyunggi-do (KR); Doo Young Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/949,080

(22) Filed: Jul. 23, 2013

(65) Prior Publication Data

US 2014/0185189 A1  Jul. 3, 2014

(30) Foreign Application Priority Data

Dec. 27, 2012  (KR) ........................ 10-2012-0155294

(51) Int. Cl.
*H01G 4/30* (2006.01)
*H01G 4/232* (2006.01)

(52) U.S. Cl.
CPC . *H01G 4/30* (2013.01); *H01G 4/232* (2013.01)
USPC ..................... 361/301.4; 361/306.3; 29/25.42

(58) Field of Classification Search
USPC ............ 361/301.4, 306.3, 303, 311; 29/25.42
See application file for complete search history.

(56) References Cited

U.S. PATENT DOCUMENTS

| | | | |
|---|---|---|---|
| 5,883,780 | A | 3/1999 | Noji et al. |
| 2012/0019099 | A1 | 1/2012 | Sato et al. |
| 2012/0019978 | A1 | 1/2012 | Yoshida |
| 2013/0056252 | A1 | 3/2013 | Fujii et al. |

FOREIGN PATENT DOCUMENTS

| | | | |
|---|---|---|---|
| JP | 63-41011 A | | 2/1988 |
| JP | 04328814 A | * | 11/1992 |
| JP | 09-246125 A | | 9/1997 |
| JP | 10-22163 | | 1/1998 |
| JP | 2009-65004 A | | 3/2009 |
| JP | 2012-119616 A | | 6/2012 |

(Continued)

OTHER PUBLICATIONS

Korean Office Action issued in Korean Application No. 10-2012-0155294 dated Feb. 27, 2014, w/English translation.

(Continued)

*Primary Examiner* — Eric Thomas
(74) *Attorney, Agent, or Firm* — McDermott Will & Emery LLP

(57) ABSTRACT

There is provided a multilayer ceramic capacitor including: a ceramic body in which a plurality of dielectric layers are laminated; a plurality of first and second internal electrodes formed to be alternately exposed to both end surfaces of the ceramic body with the dielectric layer interposed therebetween; and first and second external electrodes formed on both end surfaces of the ceramic body and electrically connected to the first and second internal electrodes, wherein when it is defined that a thickness of a band of the first and second external electrodes is T1 and a thickness of the ceramic body is T2, a ratio (T1/T2) of the thickness of the band of the first or second external electrode to the thickness of the ceramic body is equal to or less than 0.18.

8 Claims, 5 Drawing Sheets

(56) References Cited

FOREIGN PATENT DOCUMENTS

| | | |
|---|---|---|
| JP | 2013-65820 A | 4/2013 |
| KR | 2006-0082671 A | 7/2006 |
| KR | 2012-0010148 A | 2/2012 |
| KR | 2012-0018715 A | 3/2012 |
| TW | 201222590 A | 6/2012 |

OTHER PUBLICATIONS

Japanese Office Action issued in Japanese Application No. 2013-147299 dated Feb. 4, 2014, w/English Translation.
Taiwanese Examination Report issued in Taiwanese Application No. 102125178 dated Aug. 26, 2014, w/English translation.

* cited by examiner

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2012-155294 filed on Dec. 27, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

A multilayer ceramic capacitor, a laminated chip electronic component, is a chip-type condenser installed on a printed circuit board (PCB) of various electronic products such as imaging devices (or video display apparatuses) such as liquid crystal displays (LCDs), plasma display panels (PDPs), and the like, computers, personal digital assistants (PDAs), portable phones, and the like, to charge and discharge electricity.

A multilayer ceramic capacitor (MLCC), having advantages such as compactness, guaranteed high capacitance, and ease of mountability, may be used as a component in various electronic devices.

Recently, as performance of portable smart devices such as smartphones, tablet PCs, and the like, has been enhanced, a driving speed of an application processor (AP) handling calculation has been increased.

The increase in a driving speed of an AP requires a current having a higher frequency to be promptly supplied to the AP.

An MLCC serves to supply a current to such an AP.

Thus, in order to promptly supply a high frequency current, an MLCC having low equivalent series inductance (ESL) may be used or an MLCC may be embedded in a board to maximally reduce a distance to the AP therefrom.

However, using an MLCC having low ESL may trigger a different problem in terms of structure, so recently, research into an MLCC embedded in a board has been actively conducted.

Meanwhile, as portable smart devices are reduced in weight and thickness, a thickness of a board in which an MLCC is embedded has also been reduced.

In general, an embedded MLCC is designed to be thicker than a board core by about 3 μm.

A thickness of a currently used board core is less than 100 μm, so an MLCC is required to have a thickness of about 130 μm. However, recently, as the thickness of a board core has been reduced, the thickness of an MLCC has also been required to be reduced In order to reduce the thickness of an MLCC, a thickness of a ceramic body, an external electrode, and a plated layer should be reduced. A thickness of the plated layer may be maintained to be at least 5 μm or greater in consideration of an error in via processing through a laser when an MLC is embedded, so a method of reducing a thickness of a ceramic body and an external electrode may largely be used.

Here, a reduction in a thickness of a ceramic body may reduce the strength of the ceramic body. Thus, an excessive reduction in the thickness of the ceramic body may cause cracks in the ceramic body due to sintering shrinkage stress and plating stress concentrated on end portions of an external electrode. In particular, a generation frequency of cracks may be increased when a ceramic body has a thickness of less than 80 μm.

Patent document 1 below relates to an MLCC including a ceramic body including a plurality of dielectric layers and internal electrodes, and external electrodes, but without disclosing a ratio between a thickness of a ceramic body and a thickness of a band of an external electrode. Patent document 2 relates to an MLCC including a ceramic body including a plurality of dielectric layers and internal electrodes, and external electrodes, but without disclosing a ratio between a thickness of a ceramic body and a thickness of a band of an external electrode.

RELATED ART DOCUMENT (Patent document 1) Korean Patent Laid Open Publication No. 10-2006-0082671
(Patent document 2) Korean Patent Laid Open Publication No. 10-2012-0010148

SUMMARY OF THE INVENTION

In the related art, a novel scheme regarding a multilayer ceramic capacitor (MLCC), capable of reducing a generation of cracks in a ceramic body without degrading reliability, by adjusting ratios of thicknesses of a ceramic body, an external electrode, and a plated layer of an MLCC, is required.

According to an aspect of the present invention, there is provided a multilayer ceramic capacitor including: a ceramic body in which a plurality of dielectric layers are laminated; a plurality of first and second internal electrodes formed to be alternately exposed to both end surfaces of the ceramic body with the dielectric layer interposed therebetween; and first and second external electrodes formed on both end surfaces of the ceramic body and electrically connected to the first and second internal electrodes, wherein when it is defined that (or it is assumed that) a thickness of a band of the first and second external electrodes is T1 and a thickness of the ceramic body is T2, a ratio (T1/T2) of the thickness of the band of the first or second external electrode to the thickness of the ceramic body is equal to or less than 0.18.

The thickness of the ceramic body may be equal to or less than 100 μm.

The MLCC may further include first and second plated layers covering the first and second external electrodes, respectively, and when it is defined that a thickness of the bands of the first and second plated layers is Tp, a ratio (T1/Tp) between a thickness of the band of the first or second external electrode and a thickness of the band of the first or second plated layer may be equal to or more than 0.35.

A value obtained by adding thicknesses of both bands of the first and second plated layers may be equal to or less than 25 μm.

According to another aspect of the present invention, there is provided a method for manufacturing a multilayer ceramic capacitor (MLCC), including: preparing a plurality of ceramic green sheets; alternately forming a plurality of first and second internal electrodes, exposed in mutually opposing directions, in a thickness direction by using a conductive paste on the respective ceramic green sheets; laminating the plurality of ceramic green sheets with the first and second internal electrodes formed thereon to form a laminate; firing the laminate to form a ceramic body; and forming first and second external electrodes on both end surfaces of the ceramic body such that the first and second external electrodes are in contact with exposed portions of the first and second internal electrodes so as to be electrically connected thereto, wherein when it is defined that a thickness of a band of the first and second external electrodes is T1 and a thickness of the ceramic body is T2, a ratio (T1/T2) of the thickness of the band of the first or second external electrode to the thickness of the ceramic body is equal to or less than 0.18.

The first and second external electrodes may be formed according to a thermal transfer method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
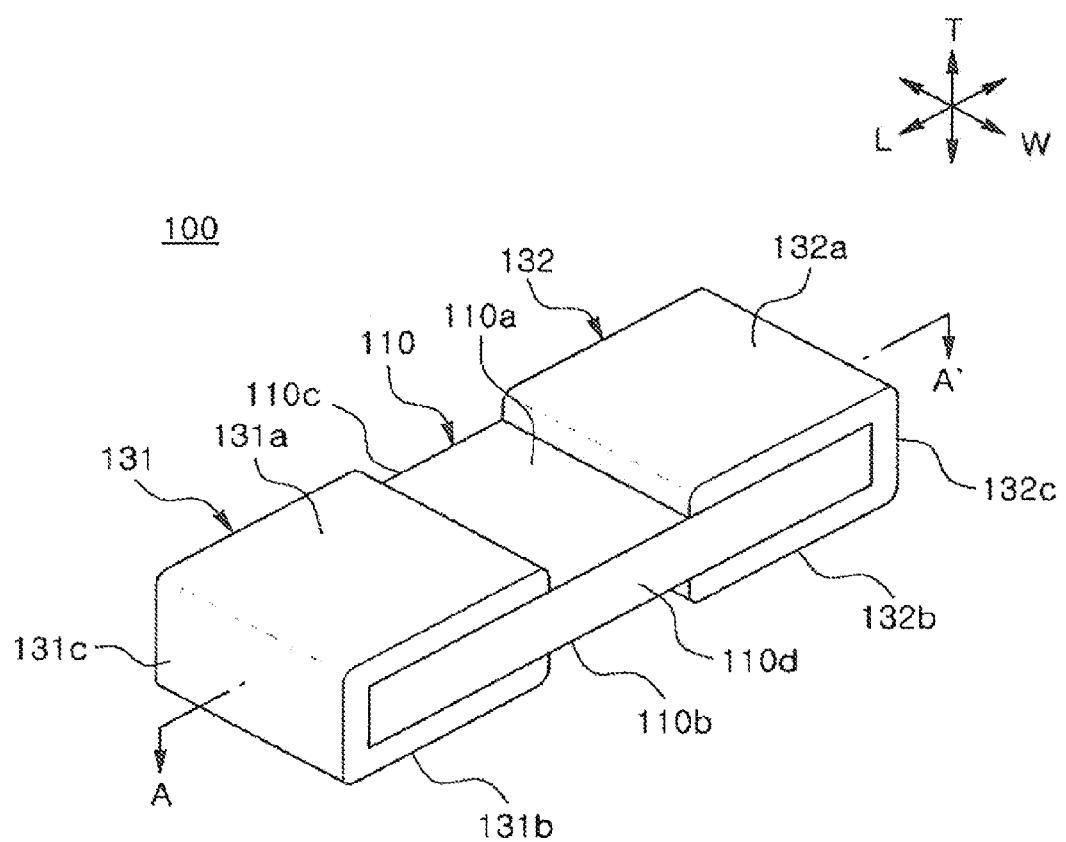
FIG. 1 is a schematic perspective view of a multilayer ceramic capacitor (MLCC) according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals.

In order to clarify embodiments of the present invention, directions of the hexahedron may be defined as follows: L, W, and T indicated in FIG. 1 denote a length direction, a width direction, and a thickness direction, respectively. Here, the thickness direction may be used to have the same concept as that of a lamination direction in which the dielectric layers are laminated.

Also, in the present embodiment, for the purposes of description, surfaces on which first and second external electrodes are formed in a length direction of the ceramic body are set as both end surfaces and surfaces perpendicular thereto are set as left and right lateral surfaces.

Figure 2:
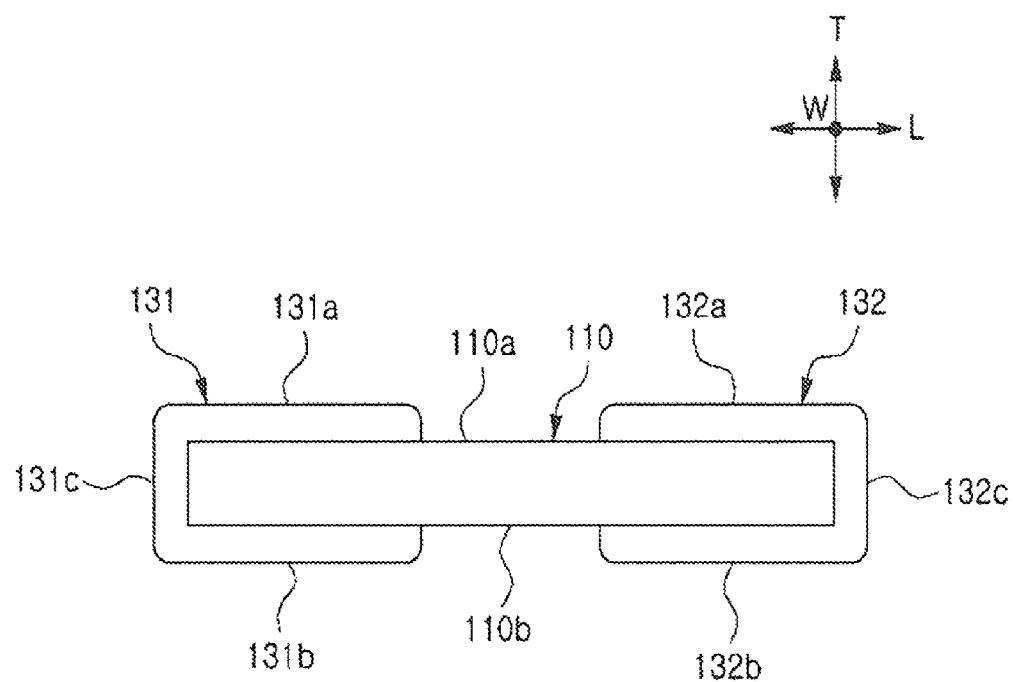
FIG. 2 is a front view schematically illustrating an MLCC according to an embodiment of the present invention.
Figure 3:
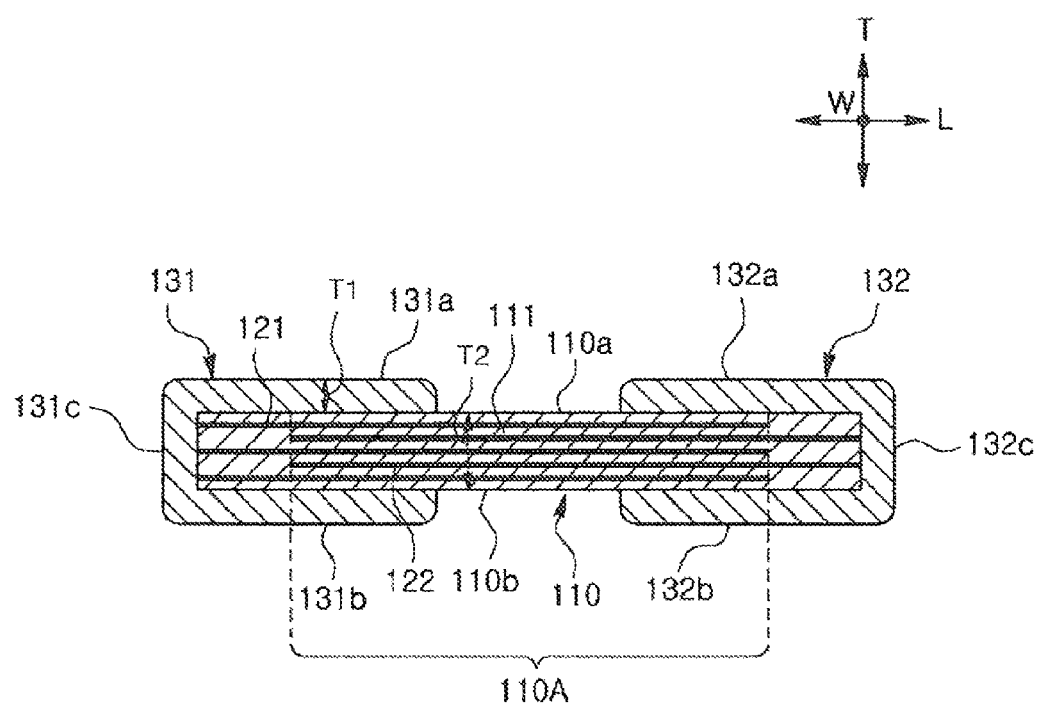
FIG. 3 is a cross-sectional view taken along line A-A' in FIG. 1.

FIG. 1 is a schematic perspective view of a multilayer ceramic capacitor (MLCC) according to an embodiment of the present invention. FIG. 2 is a front view schematically illustrating an MLCC according to an embodiment of the present invention. FIG. 3 is a cross-sectional view taken along line A-A' in FIG. 1.

Referring to FIGS. 1 through 3, an MLCC 100 according to an embodiment of the present invention may include a ceramic body 110, first and second internal electrodes 121 and 122, and first and second external electrodes 131 and 132.

The ceramic body 110 may be formed to have a hexahedral shape having first and second main surfaces 110a and 110b and first and second lateral surfaces 110c and 110d. The first and second main surfaces 110a and 110b may extend in the length (L) direction and the width (W) direction. The first and second lateral surfaces 110c and 110d may extend in the thickness (T) direction and the length (L) direction.

The ceramic body 110 is formed by laminating a plurality of dielectric layers 111 in the thickness (T) direction and subsequently firing the same. A configuration and dimensions of the ceramic body 110 and a lamination amount of the dielectric layers 111 are not limited to those illustrated in the present embodiment.

Also, the plurality of dielectric layers 111 forming the ceramic body 110 are in a sintered state and adjacent dielectric layers 50 may be integrated such that boundaries therebetween may not be readily apparent without the use of a scanning electron microscope (SEM).

The ceramic body 110 may include an active region as a portion of the capacitor contributing to a formation of capacitance, and upper and lower margin portions formed on upper and lower portions of the active region. The upper and lower margin portions may prevent damage to the first and second internal electrodes 121 and 122 due to physical or chemical stress.

A thickness of the dielectric layer 111 may be arbitrarily changed according to design of capacitance of the MLCC 100. Also, the dielectric layer 111 may be made of ceramic powder having high dielectric constant (or high K-dielectrics), e.g., a barium titanate ($BaTiO_3$)-based powder, a strontium titanate ($SrTiO_3$)-based powder, or the like, but the present invention is not limited thereto.

The first and second internal electrodes 121 and 122, a pair of electrodes having different polarities, may be formed by printing a conductive paste including a conductive metal to have a predetermined thickness on the plurality of dielectric layers 111 laminated in the thickness (T) direction, such that the first and second internal electrodes 121 and 122 are alternately exposed to both end surfaces of the ceramic body 110 in a lamination direction of the dielectric layers 111. The first and second internal electrodes 121 and 122 may be electrically insulated from one another by the dielectric layer 111 disposed therebetween.

Namely, the first and second internal electrodes 121 and 122 may be electrically connected to the first and second external electrodes 131 and 132 formed on both end surfaces of the ceramic body 110 through portions thereof alternately exposed to both end surfaces of the ceramic body 110.

Thus, when a voltage is applied to the first and second external electrodes 131 and 132, charges are accumulated between the mutually opposing first and second internal electrodes 121 and 122. In this case, capacitance of the MLCC 100 is proportional to an area of a mutual overlap region between the first and second internal electrodes 121 and 122.

A width of the first and second internal electrodes may be determined according to purpose. For example, a thickness of the first and second internal electrodes may be determined to range from 0.2 µm to 1.0 µm, but the present invention is not limited thereto.

Also, a conductive metal included in the conductive paste forming the first and second internal electrodes 121 and 122 may be nickel (Ni), copper (Cu), palladium (Pd), or an alloy thereof, but the present invention is not limited thereto.

Also, the conductive paste may be printed by using a screen printing method, a gravure printing method, or the like, but the present invention is not limited thereto.

The first and second external electrodes 131 and 132 may be formed to cover portions of upper and lower portions of the ceramic body 110 in both end surfaces of the ceramic body 110.

The first and second external electrodes 131 and 132 may include bands 131a, 131b, 132a, and 132b covering portions of the first and second main surfaces 110a and 110b of the ceramic body 110, and head portions 131c and 132c covering both end surfaces of the ceramic body 110 in the length (L) direction.

In the related art method for forming an external electrode, a method of dipping a ceramic body in a paste including a metal component has been largely used. Here, in order to reduce a thickness of a chip such as an embedded multilayer ceramic capacitor (MLCC), viscosity of the paste is lowered to minimize an amount of the paste applied to form an external electrode.

In this case, however, when viscosity of the paste is low, the thickness of the external electrode may be reduced accordingly, but the external electrode may fail to properly cover a corner portion of the ceramic body due to firing shrinkage when the external electrode is fired Thus, when a corner portion of the ceramic body is exposed, moisture may infiltrate into the exposed portion to degrade moisture resistance reliability and adhesion between the ceramic body and the external electrode is also reduced, causing a problem in that the external electrode may be separated from the end surface of the ceramic body even with small impact applied thereto.

Thus, due to the problem, with the current dipping method, it is difficult to reduce the thickness of an external electrode to, for example, below 12 μm.

In general, in a case in which a ceramic body is formed to have a thickness equal to or less than 80 μm, if an external electrode has a thickness of about 12 μm, vertical cracks may be generated in a portion of the ceramic body in which an end of the external electrode is positioned due to shrinkage stress of the external electrode. Such cracks may be increased as the thickness of the ceramic body is reduced.

In the present embodiment, the first and second external electrodes 131 and 132 may be formed according to a heat transfer method. The heat transfer method allows for a formation of an external electrode covering the entirety of corner portions of the ceramic body, securing reliability, and having a thickness equal to or less than 12 μm as necessary.

Thus, preferably, a thickness of the ceramic body 110 is equal to or less than 100 μm, and preferably, the sum of the thickness of the ceramic body 110 and the upper and lower thicknesses of the bands 131a, 131b, 132a, and 132b of the first and second external electrodes 131 and 132 is equal to or less than 120 μm.

Referring to FIG. 4, according to the heat transfer method, first, a paste printing portion 210 desired to be transferred is printed thinly on a plate 200 made of a heterogeneous material.

Figure 4A:
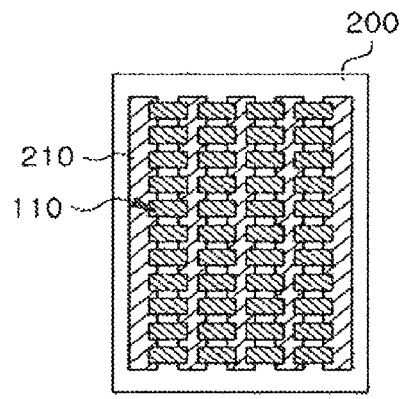
FIGS. 4A to 4D are plan views illustrating a process of forming external electrodes on both end surfaces of a ceramic body of an MLCC according to a thermal transfer method according to an embodiment of the present invention.
Figure 4B:
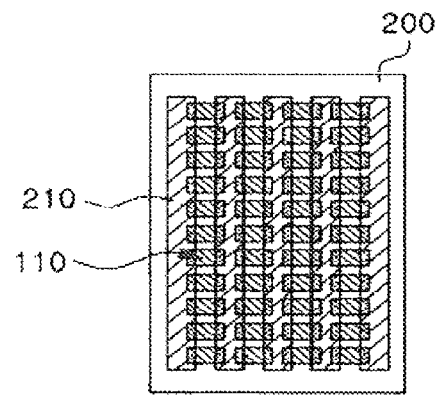

Next, as illustrated in FIGS. 4(a) and 4(b), the ceramic body 110 is fixed to the paste printing portion 210 in the thickness (T) direction and the paste printing portion 210 is heated to allow a print surface to be transferred to both end surfaces of the ceramic body 110 to form the bands 131a, 131b, 132a, and 132b of the first and second external electrodes 131 and 132.

Figure 4C:
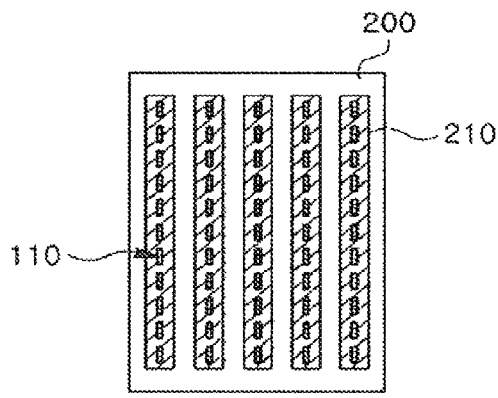
Figure 4D:
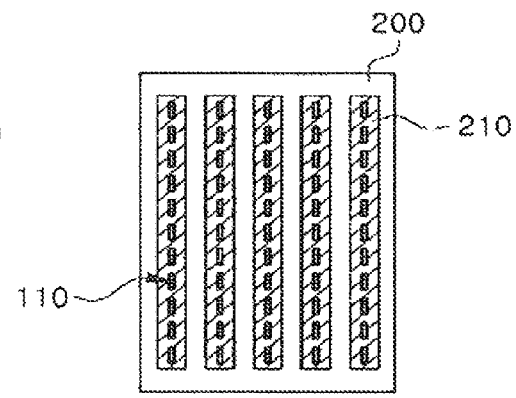

Thereafter, as illustrated in FIGS. 4(c) and 4(d), the ceramic body 110 is alternately fixed to the paste printing portion 210 in the length (L) direction and the paste printing portion 210 is heated to allow the printed surface to be transferred to the both end surfaces of the ceramic body 110 to form the head portions 131c and 132c of the first and second external electrodes 131 and 132, thereby forming the first and second external electrodes 131 and 132.

In this manner, in the present embodiment, the first and second external electrodes 131 and 132 are formed by using a screen printing method. Thus, a thickness of the printed paste, which eventually forms the thickness of the first and second external electrodes 131 and 132, may be freely adjusted to range from 0.5 μm to 10 μm, and the thickness of the first and second external electrodes 131 and 132 may also be freely adjusted to range from 0.5 μm to 10 μm. However, the thickness of the external electrodes of the present invention is not limited thereto.

Also, the conductive paste constituting the paste printing portion 210 may include a conductive metal. The conductive metal may be nickel (Ni), copper (Cu), palladium (Pd), gold (Au), or an alloy thereof, but the present invention is not limited thereto.

Meanwhile, although the MLCC 100 having the first and second external electrodes 131 and 132 having a reduced thickness is fabricated by using the heat transfer method, if the bands 131a, 131b, 132a, and 132b of the first and second external electrodes 131 and 132 are too thick relative to the thickness of the ceramic body 110, cracks may still be generated in the ceramic body 110 when the external electrodes are fired.

Referring to FIG. 3, it is defined that a thickness of the bands 131a, 131b, 132a, and 132b of the first or second external electrode 131 or 132 is T1 and a thickness of the ceramic body 110 is T2.

The MLCC according to the present embodiment is an embedded MLCC 100, and in this case, preferably, the thickness T2 of the ceramic body 110 is equal to or less than 100 μm and a value obtained by adding the thicknesses of both bands 131a, 131b, 132a, and 132b of the first or second external electrode 131 or 132 thereto is equal to or less than 120 μm.

In order to effectively prevent a generation of cracks in the ceramic body 110, a ratio (T1/T2) of the thickness (T1) of the bands 131a, 131b, 132a, and 132b of the first or second external electrode 131 or 132 to the thickness T2 of the ceramic body 110 may be adjusted to be equal to or less than 0.18.

Figure 5:
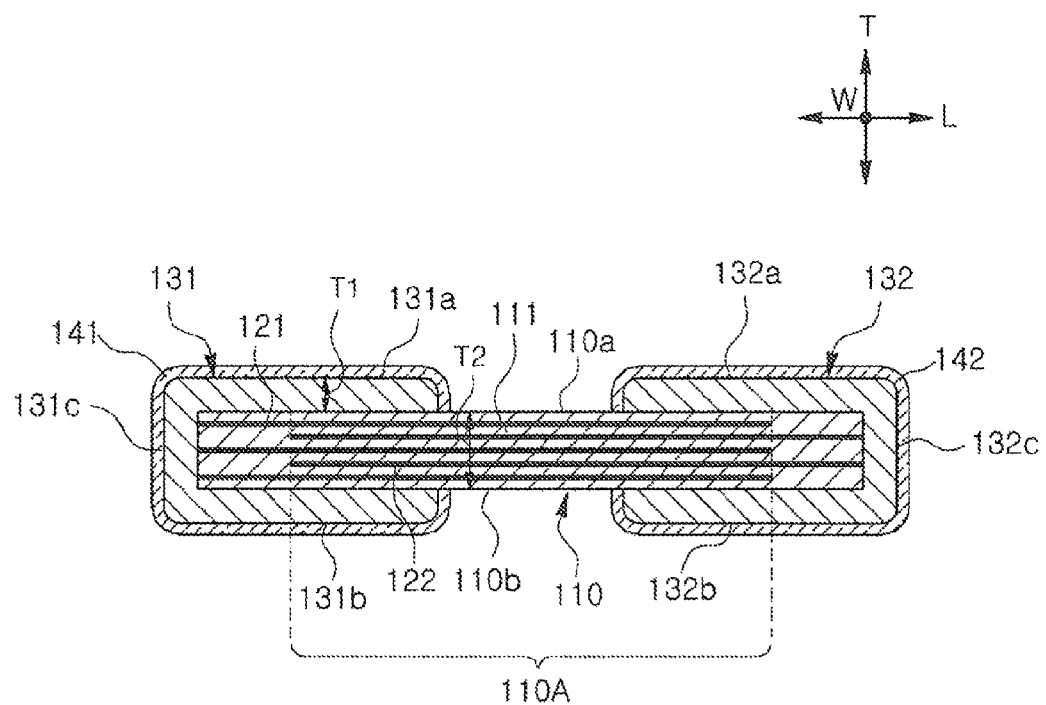
FIG. 5 is a cross-sectional view schematically illustrating a structure in which plated layers are added to the MLCC of FIG. 3.

Meanwhile, as illustrated in FIG. 5, first and second plated layers 141 and 142 may be further formed on both end surfaces of the ceramic body 110 to cover the first and second external electrodes 131 and 132. Here, in order to prevent infiltration of moisture into the ceramic body 110 to degrade reliability, the sum of the thicknesses of the upper and lower bands of the first and second plated layers 141 and 142 may be adjusted to be equal to or less than 25 μm.

The first and second plated layers 141 and 142 may prevent a generation of cracks in the ceramic body 110 due to shrinkage stress or tensile stress generated in the process of performing plating on the external electrodes, further increasing the effect of preventing a generation of cracks.

However, if the bands of the first or second plated layer 141 or 142 are too thick, relative to the thickness of the bands 131a, 131b, 132a, and 132b of the first or second external electrode 131 or 132, the first and second external electrodes 131 and 132 may fail to completely alleviate plating stress, so residual stress may be applied to the ceramic body 110 to cause cracks in the ceramic body 110.

Thus, when a thickness of the bands of the first and second plated layers 141 and 142 is defined as Tp, in order to effectively prevent a generation of cracks in the ceramic body 110, a ratio (Tp/T1) of the band of the first or second plated layer 141 or 142 to the thickness T1 of the bands 131a, 131b, 132a, and 132b of the first or second external electrode 131 or 132 may be adjusted to be 0.35 (i.e., 0.35:1) or more.

Hereinafter, relationships between dimensions of components included in the MLCC 100 according to the present embodiment and a crack generation will be described.

Experimental Example

Multilayer ceramic capacitors (MLCC) according to embodiments of the present invention and comparative examples were fabricated as follows.

First, a slurry including a powder such as barium titanate ($BaTiO_3$) powder, or the like, was applied to a carrier film and then dried to prepare a plurality of ceramic green sheets having a predetermined thickness.

Next, a plurality of first and second internal electrodes 121 and 122 were formed by applying a conductive paste to the plurality of ceramic green sheets by using a screen, or the like, such that the plurality of first and second internal electrodes 121 and 122 are alternately exposed to both end surfaces of the ceramic green sheets opposing one another.

Thereafter, the plurality of ceramic green sheets were laminated in the thickness (T) direction to form a laminate (or a lamination body), and the laminate was isostatically-pressed under conditions of a pressure of 1000 kgf/cm² at a temperature of about 85° C.

The pressing-completed ceramic laminate was cut into individual chips, and a debinding process was performed on the severed chips at a temperature of 230° C. for 60 hours under an air atmosphere.

Thereafter, the chips were fired at 1200° C. at an oxygen partial pressure of $10^{-11}$ atm~$10^{-10}$ atm, lower than a Ni/NiO equilibrium oxygen partial pressure, under a reduced atmosphere such that the first and second internal electrodes 121 and 122 were not oxidized. After the firing operation, a size (length×width (L×W)) of the ceramic element 110 was about 0.950 mm×0.500 mm (L×W, 1005 size). Here, a fabrication tolerance was determined to be ±0.1 mm in length×width (L×W).

Thereafter, the first and second external electrodes 131 and 132 were formed on both end surfaces of the ceramic body 110. The first and second external electrodes 131 and 132 may be formed according to a thermal transfer method in order to have a reduced thickness, while securing reliability.

Here, the first and second external electrodes 131 and 132 may be formed such that a value obtained by adding the thickness T2 of the ceramic body 110 and the thickness T1 of the both bands 131a, 131b, 132a, and 132b of the first and second external electrodes 131 and 132 is equal to or less than 120 μm.

Also, a ratio (T1/T2) of the thickness T1 of the both bands 131a, 131b, 132a, and 132b of the first and second external electrodes 131 and 132 to the thickness T2 of the ceramic body 110 is equal to or less than 0.18.

Thereafter, a plating process may be performed to form the first and second plated layers to cover the first and second external electrodes 131 and 132 on both end surfaces of the ceramic body 110.

Here, a value obtained by adding the thicknesses of both bands of the first and second plated layers may be equal to or less than 25 μm.

Also, a ratio of the thickness Tp of the band of the first or second plated layer 141 or 142 to the thickness T1 of the bands 131a, 131b, 132a, and 132b of the first and second external electrodes 131 and 132 may be equal to or more than 0.35.

After the MLCC 100 was fabricated and tested to measure a frequency of crack generation and frequency of defective reliability.

TABLE 1

| Sample # | Thickness of ceramic body | Thickness of band of external electrode | Thickness (T2) of ceramic body: thickness (T1) of band of external electrode | Frequency of crack generation |
|---|---|---|---|---|
| 1 | 60 | 15 | 0.2500 | 35/200 |
| 2 | 60 | 20 | 0.3333 | 44/200 |
| 3 | 60 | 25 | 0.4167 | 81/200 |
| 4 | 80 | 15 | 0.1875 | 21/200 |
| 5 | 80 | 20 | 0.2500 | 44/200 |
| 6 | 80 | 25 | 0.3125 | 76/200 |
| 7 | 100 | 15 | 0.1500 | 0/200 |
| 8 | 100 | 20 | 0.2000 | 1/200 |
| 9 | 100 | 25 | 0.2500 | 1/200 |
| 10 | 120 | 15 | 0.1250 | 0/200 |
| 11 | 120 | 20 | 0.1667 | 0/200 |
| 12 | 120 | 25 | 0.2083 | 0/200 |
| 13 | 140 | 15 | 0.1071 | 0/200 |
| 14 | 140 | 20 | 0.1429 | 0/200 |
| 15 | 140 | 25 | 0.1786 | 0/200 |

Data in Table 1 was obtained by measuring dimensions of a section of the central portion of the ceramic body 110 of the MLCC 100 taken in the length direction (L) and the thickness direction (T) from the central portion of the ceramic body 110 in the width (W) direction of the ceramic body 110 of the MLCC 100 as shown in FIG. 3, based on images taken with a scanning electron microscope (SEM).

Here, as mentioned above, the thickness of the bands 131a, 131b, 132a, and 132b of the first and second external bands 131 and 132 is defined as T1 and the thickness of the ceramic body 110 is defined as T2. In order to measure the frequency of crack generation, 200 samples of each case were checked.

In Table 1, in samples 1 to 3 as comparative examples, a thickness of the ceramic body 110 was 60 μm and a thickness of the first or second external electrode 131 or 132 was relatively large to result in a ratio equal to or higher than 0.20. In samples 4 through 6, as comparative examples, a thickness of the ceramic body 110 was 80 μm and a thickness of the first or second external electrode 131 or 132 was relatively large to result in a ratio exceeding 0.18. In samples 8 and 9 as comparative examples, a thickness of the ceramic body 110 was 100 μm and a thickness of the bands 131a, 131b, 132a, and 132b of the first or second external electrode 131 or 132 was relatively large to result in a ratio equal to or more than 0.20.

In sample 7 as an embodiment, a thickness of the ceramic body 110 was 100 μm and a thickness of the bands 131a, 131b, 132a, and 132b of the first or second external electrode 131 or 132 was relatively small to result in a ratio equal to 0.15. In sample 10 to sample 15 as embodiments, a thickness of the ceramic body 110 was 120 μm or 140 μm and a thickness of the bands 131a, 131b, 132a, and 132b of the first or second external electrode 131 or 132 was relatively small to result in a ratio equal to or less than 0.18.

Referring to Table 1, it can be confirmed that the ceramic body 110 is free from a generation of cracks in the case in which the ratio of the thickness of the bands 131a, 131b, 132a, and 132b of the first or second external electrode 131 or 132 to the thickness of the ceramic body 110 is equal to or less than 0.18.

Table 2 below shows a generation of cracks and defective reliability of the MLCC 100 according to a thickness of the bands 131a, 131b, 132a, and 132b of the first or second external electrode 131 or 132 and a thickness of the band of first and second plated layers 141 and 142 when a thickness of the ceramic body 110 is 80 μm.

In samples 25-26, 28-29, 31-32, 34-35, 37-38, and 40-45 as embodiments, a ratio of the thickness of the bands 131a, 131b, 132a, and 132b of the first or second external electrode 131 or 132 to the thickness of the ceramic body 110 was equal to or less than 0.18, and a ratio of the thickness of the first and second plated layers 141 and 142 to the thickness of the bands 131a, 131b, 132a, and 132b of the first or second external electrode 131 or 132 was equal to or higher than 0.35.

Referring to Table 2, it can be confirmed that the ceramic body 110 is free from a generation of cracks and defective

TABLE 2

| Sample # | Thickness of band of external electrode [μm] | Thickness of band of plated layer [μm] | Thickness (T2) of ceramic body: thickness of band of external electrode (T1) | Thickness of band of plated layer [μm] | Thickness (T1) of band of external electrode: thickness (Tp) of band of plated layer | Frequency of crack generation | Frequency of defective reliability generation |
|---|---|---|---|---|---|---|---|
| 16 | 20 | 12 | 0.2500 | 12 | 0.6000 | 104/200 | 0/100 |
| 17 | 20 | 5 | 0.2500 | 5 | 0.2500 | 104/201 | 34/200 |
| 18 | 20 | 3 | 0.2500 | 3 | 0.1500 | 104/202 | 11/200 |
| 19 | 18 | 12 | 0.2250 | 12 | 0.6667 | 87/200 | 0/100 |
| 20 | 18 | 5 | 0.2250 | 5 | 0.2778 | 87/201 | 21/200 |
| 21 | 18 | 3 | 0.2250 | 3 | 0.1667 | 87/202 | 13/200 |
| 22 | 16 | 12 | 0.2000 | 12 | 0.7500 | 51/200 | 0/100 |
| 23 | 16 | 5 | 0.2000 | 5 | 0.3125 | 51/201 | 7/200 |
| 24 | 16 | 3 | 0.2000 | 3 | 0.1875 | 51/202 | 24/200 |
| 25 | 14 | 12 | 0.1750 | 12 | 0.8571 | 0/200 | 0/100 |
| 26 | 14 | 5 | 0.1750 | 5 | 0.3571 | 0/201 | 0/100 |
| 27 | 14 | 3 | 0.1750 | 3 | 0.2143 | 0/202 | 27/200 |
| 28 | 13 | 12 | 0.1625 | 12 | 0.9231 | 0/200 | 0/100 |
| 29 | 13 | 5 | 0.1625 | 5 | 0.3846 | 0/201 | 0/100 |
| 30 | 13 | 3 | 0.1625 | 3 | 0.2308 | 0/202 | 19/200 |
| 31 | 12 | 12 | 0.1500 | 12 | 1.0000 | 0/200 | 0/100 |
| 32 | 12 | 5 | 0.1500 | 5 | 0.4167 | 0/201 | 0/100 |
| 33 | 12 | 3 | 0.1500 | 3 | 0.2500 | 0/202 | 22/100 |
| 34 | 11 | 12 | 0.1375 | 12 | 1.0909 | 0/200 | 0/100 |
| 35 | 11 | 5 | 0.1375 | 5 | 0.4545 | 0/201 | 0/100 |
| 36 | 11 | 3 | 0.1375 | 3 | 0.2727 | 0/202 | 18/200 |
| 37 | 10 | 12 | 0.1250 | 12 | 1.2000 | 0/200 | 0/100 |
| 38 | 10 | 5 | 0.1250 | 5 | 0.5000 | 0/201 | 0/100 |
| 39 | 10 | 3 | 0.1250 | 3 | 0.3000 | 0/202 | 21/200 |
| 40 | 8 | 12 | 0.1000 | 12 | 1.5000 | 0/200 | 0/100 |
| 41 | 8 | 5 | 0.1000 | 5 | 0.6250 | 0/201 | 0/100 |
| 42 | 8 | 3 | 0.1000 | 3 | 0.3750 | 0/202 | 0/100 |
| 43 | 6 | 12 | 0.0750 | 12 | 2.0000 | 0/200 | 0/100 |
| 44 | 6 | 5 | 0.0750 | 5 | 0.8333 | 0/201 | 0/100 |
| 45 | 6 | 3 | 0.0750 | 3 | 0.5000 | 0/202 | 0/100 |

Here, as mentioned above, the thickness of the bands 131a, 131b, 132a, and 132b of the first and second external bands 131 and 132 is defined as T1 and the thickness of the ceramic body 110 is defined as T2.

Also, the thickness of the band of the first and second plated layers 141 and 142 was defined as Tp. In order to measure the frequency of crack generation and the frequency of defective reliability generation, 200 samples of each case were checked.

In Table 2, in samples 16 through 24 as comparative examples, a ratio of the thickness of the bands 131a, 131b, 132a, and 132b of the first or second external electrode 131 or 132 to the thickness of the ceramic body 110 exceeded 0.18. In samples 17-18, 20-21, 23-24, 27, 30, 33, 36 and 39, a ratio of the thickness of the first and second plated layers 141 and 142 to the thickness of the bands 131a, 131b, 132a, and 132b of the first or second external electrode 131 or 132 was less than 0.35.

reliability in the case in which the ratio of the thickness of the bands 131a, 131b, 132a, and 132b of the first or second external electrode 131 or 132 to the thickness of the ceramic body 110 is equal to or less than 0.18 and the ratio of the thickness of the first and second plated layers 141 and 142 to the thickness of the bands 131a, 131b, 132a, and 132b of the first or second external electrode 131 or 132 is equal to or more than 0.35

As set forth above, according to embodiments of the present invention, a crack generation of the ceramic body can be reduced without degrading reliability by adjusting the ratios of thicknesses of the ceramic body, the external electrodes and the plated layers of the MLCC.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a ceramic body in which a plurality of dielectric layers are laminated;
a plurality of first and second internal electrodes formed to be alternately exposed to both end surfaces of the ceramic body with the dielectric layer interposed therebetween; and
first and second external electrodes formed on both end surfaces of the ceramic body and electrically connected to the first and second internal electrodes, wherein:
when a thickness of a band of the first and second external electrodes is T1 and a thickness of the ceramic body is T2,
a ratio (T1/T2) of the thickness of the band of the first or second external electrode to the thickness of the ceramic body is equal to or less than 0.18, and
the thickness of the ceramic body is equal to or less than 100 μm.

2. The multilayer ceramic capacitor of claim 1, wherein the MLCC further comprises first and second plated layers covering the first and second external electrodes, respectively, and
when a thickness of the bands of the first and second plated layers is Tp,
a ratio (T1/Tp) between a thickness of the band of the first or second external electrode and a thickness of the band of the first or second plated layer is equal to or more than 0.35.

3. The multilayer ceramic capacitor of claim 2, wherein a value obtained by adding thicknesses of both bands of the first and second plated layers is equal to or less than 25 μm.

4. The multilayer ceramic capacitor of claim 1, wherein the first and second external electrodes are formed according to a thermal transfer method.

5. A method for manufacturing a multilayer ceramic capacitor (MLCC), the method comprising:
preparing a plurality of ceramic green sheets;
alternately forming a plurality of first and second internal electrodes, exposed in mutually opposing directions, in a thickness direction by using a conductive paste on the respective ceramic green sheets;
laminating the plurality of ceramic green sheets with the first and second internal electrodes formed thereon to form a laminate;
firing the laminate to form a ceramic body; and
forming first and second external electrodes on both end surfaces of the ceramic body such that the first and second external electrodes are in contact with exposed portions of the first and second internal electrodes so as to be electrically connected thereto, wherein:
when a thickness of a band of the first and second external electrodes is T1 and a thickness of the ceramic body is T2,
a ratio (T1/T2) of the thickness of the band of the first or second external electrode to the thickness of the ceramic body is equal to or less than 0.18, and
the thickness of the ceramic body is less than 100 μm.

6. The method of claim 5, further comprising: forming first and second plated layers to cover the first and second external electrodes, after the forming of the first and second external electrodes,
wherein when a thickness of a band of the first and second plated layers is defined as Tp,
the first and second plated layers are formed such that a ratio (T1/Tp) of a thickness of the band of the first or second external electrode and a thickness of the first or second plated layer is equal to or more than 0.35.

7. The method of claim 6, wherein in the forming of the first and second plated layers, the first and second plated layers are formed such that a value obtained by adding thicknesses of both bands of the first and second plated layers is equal to or less than 25 μm.

8. The method of claim 5, wherein in the forming of the first and second external electrodes, the first and second external electrodes are formed according to a thermal transfer method.

* * * * *